Oct. 29, 1963  W. H. EBURN, JR., ETAL  3,108,525
PHOTOGRAPHIC APPARATUS
Filed Nov. 25, 1960  4 Sheets-Sheet 1
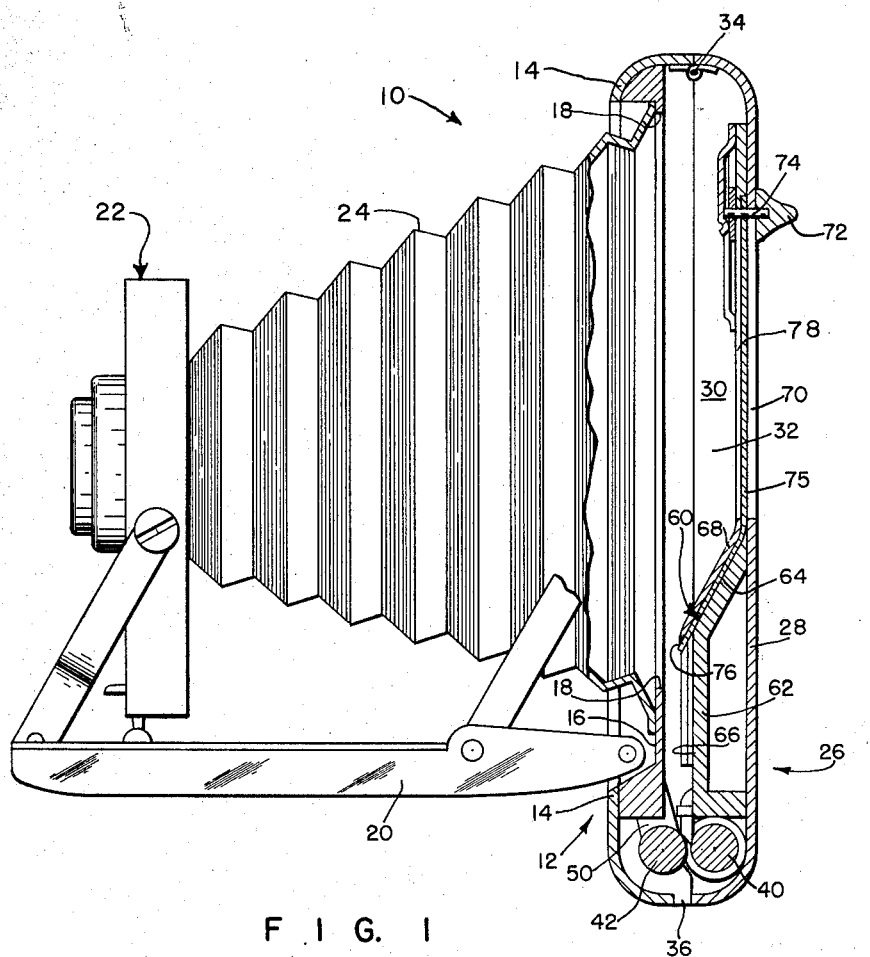
F I G. 1
INVENTORS
William H. Eburn, Jr.
BY Otto E. Hoff
Brown and Mikulka
and
Robert E. Carb
ATTORNEYS Oct. 29, 1963  W. H. EBURN, JR., ETAL  3,108,525
PHOTOGRAPHIC APPARATUS
Filed Nov. 25, 1960  4 Sheets-Sheet 2
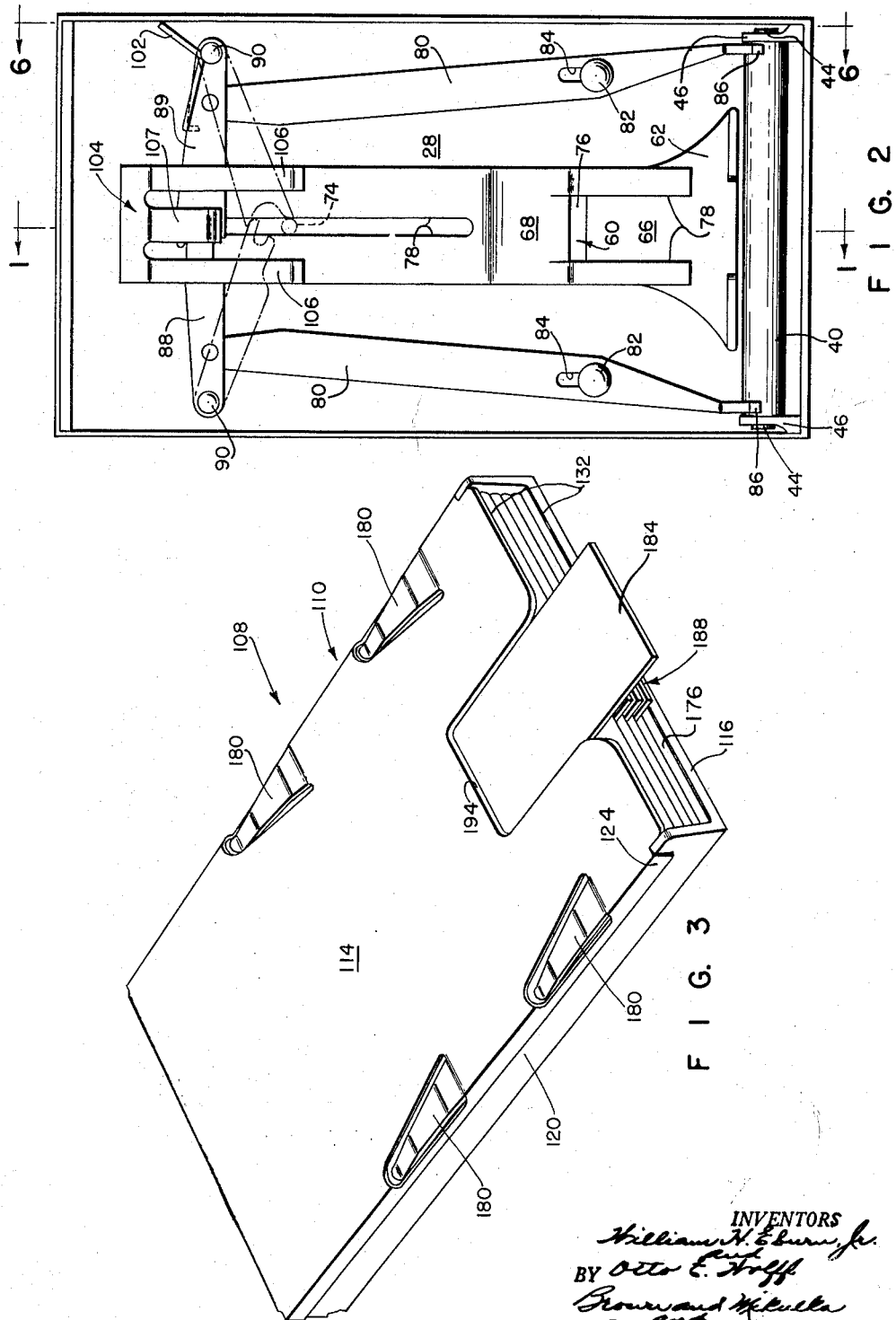
INVENTORS
William H. Eburn, Jr.
BY Otto E. Wolff
Broward Mikulka
and
Robert E. Corb
ATTORNEYS Oct. 29, 1963  W. H. EBURN, JR., ETAL  3,108,525
PHOTOGRAPHIC APPARATUS
Filed Nov. 25, 1960  4 Sheets-Sheet 3
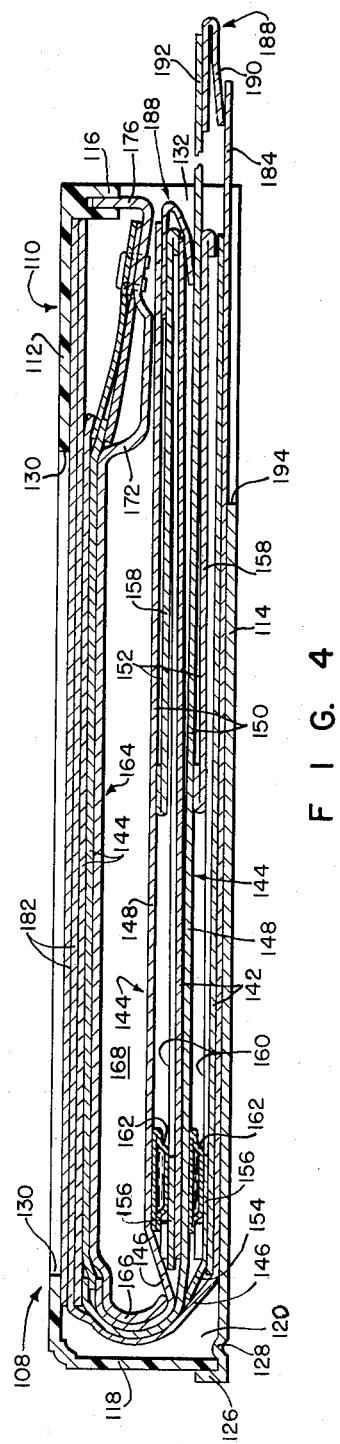
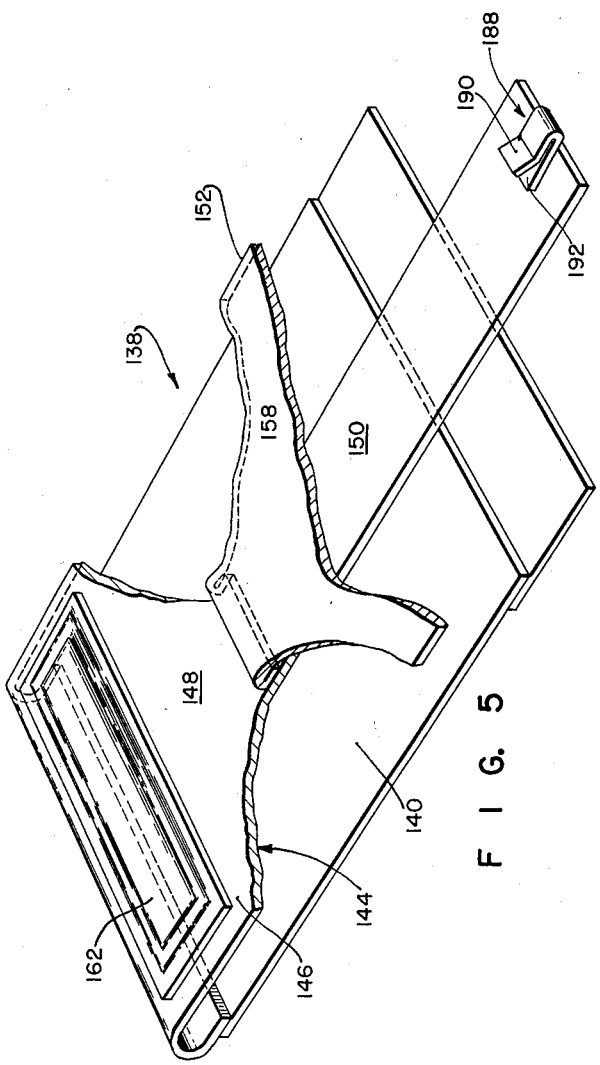
INVENTORS
William H. Eburn, Jr.
Otto E. Wolff
BY Bernard Mikula
and
Robert E. Corb
ATTORNEYS

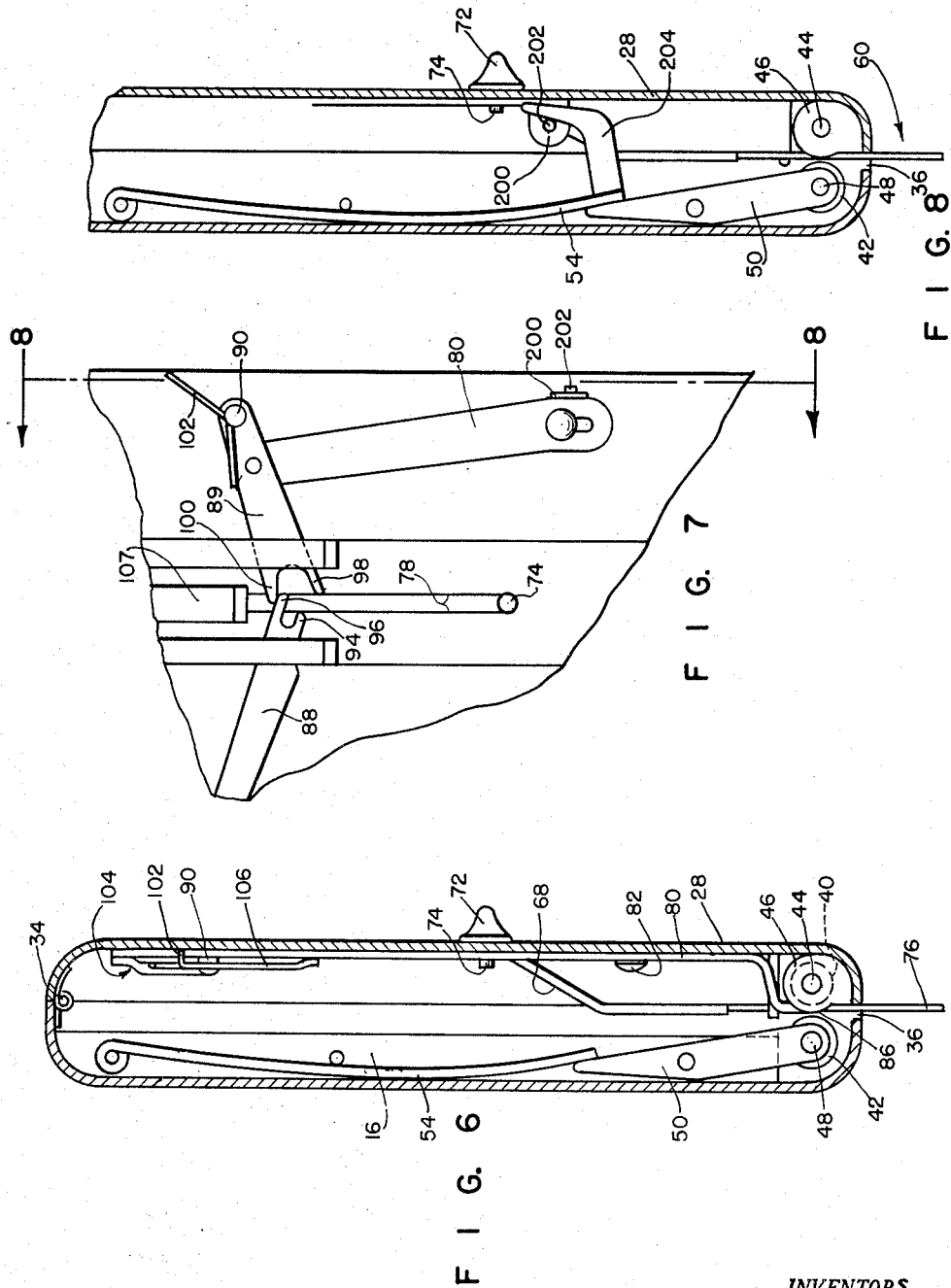

3,108,525
PHOTOGRAPHIC APPARATUS

William H. Eburn, Jr., East Weymouth, and Otto E. Wolff, Weston, Mass., assignors to Polaroid Corporation, Cambridge, Mass., a corporation of Delaware
Filed Nov. 25, 1960, Ser. No. 71,710
12 Claims. (Cl. 95—13)

This invention relates to photographic apparatus and more particularly to apparatus such as a camera wherein photosensitive materials are exposed and processed.

An object of the invention is to provide in photographic apparatus such as a camera including a pair of juxtaposed pressure-applying members between which a film unit is moved for distributing a processing fluid within said film unit, a leader-feeding element movable between the pressure-applying members for feeding a leader of the film unit therebetween, and means for automatically relieving the pressure exerted by said pressure-applying members during movement of the leader-feeding element between the pressure-applying members.

Other objects of the invention are: to provide apparatus of the type described, including means for spacing the pressure-applying members apart from one another for as long as the leader-feeding element is located between the pressure-applying members, and in which the operations of the leader-feeding element and the means for spacing the pressure-applying members apart from one another are coordinated by virtue of their actuation by a single driving means; and to provide apparatus of the type described in which pressure exerted by the pressure-applying members is relieved by relieving the bias on a spring provided for urging the pressure-applying members toward one another.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 is an elevational view, partially in section, of a camera embodying the invention, the section being taken substantially midway between the sides of the camera;

FIG. 2 is an elevational view of the rear section of the camera of FIGURE 1;

FIG. 3 is a rear perspective view of a photographic film assemblage useful in the camera of FIGURE 1;

FIG. 4 is a sectional view taken substantially midway between the sides of the film assemblage of FIG. 3;

FIG. 5 is a fragmentary perspective view showing a film unit comprising the film assemblage of FIG. 3;

FIG. 6 is a sectional view taken through the camera of FIGURE 1 substantially along the line 6—6 of FIG. 2;

FIG. 7 is a fragmentary view similar to FIG. 2 illustrating another embodiment of the invention; and FIG. 8 is a fragmentary sectional view taken substantially along the line 8—8 of FIG. 7.

The present invention is embodied in photographic apparatus, particularly cameras of the type in which a photosensitive sheet is exposed and is thereafter processed. Processing of the photosensitive sheet is accomplished by superposing it with a second sheet and distributing a fluid-processing agent in a layer between the sheets by moving the two sheets in superposition between a pair of juxtaposed members which apply compressive pressure to the sheets to spread the fluid in a thin layer. The camera in which the present invention is embodied is the type shown in the copending U.S. application of William H. Eburn, Jr., et al., Serial No. 71,709, filed November 25, 1960, now Patent No. 3,062,115. This type of camera is designed to be used with an assemblage of individual photographic film units each comprising a photosensitive sheet and a second sheet which are superposed during the processing of the photosensitive sheet by a fluid carried by the film unit. The photosensitive and second sheets are joined to one another by a leader which is employed for moving the photosensitive sheet, following exposure thereof, into superposition with the second sheet and for drawing the film units comprising the photosensitive and second sheets between a pair of juxtaposed pressure-applying members. There is described, in the above-mentioned application, means for advancing the leaders of successive film units, one at a time and in proper succession, from the camera between the pressure-applying members, so that each leader may be grasped manually for withdrawing the film unit which it comprises from the camera between the pressure-applying members to effect the distribution of a processing fluid between the photosensitive and second sheets comprising each film unit.

The present invention relates to the system for feeding the leaders of film units between the pressure-applying members so that the leaders may be grasped for withdrawing the film units from the camera between the pressure-applying members. In the particular system with which the present application is concerned, a tongue-shaped element is provided for engaging a leader in the camera at one side of the pressure-applying members and moving the leader between the pressure-applying members to the opposite side thereof. During movement of the leader from the camera, the tongue-shaped element itself extends between the pressure-applying members and thereby provides a positive system, i.e., a system which is not dependent on friction or engagement with another film unit, for feeding the leaders from the camera.

This particular leader-feeding system and its advantages are the subject matter of the above-mentioned application, and the present application represents an improvement in leader-feeding systems of this type which incorporates means for automatically relieving the pressure exerted by the pressure-applying members during the time when the tongue-shaped leader-feeding element extends between the pressure-applying members. This is desirable because the leader-feeding element may, of necessity, be thicker than the materials comprising the film unit and thereby offers considerable resistance to movement between the pressure-applying members, particularly when associated with a leader being fed between the pressure-applying members. When pressure is exerted by the pressure-applying members to the leader and tongue element, frictional forces are generated between the two, i.e., the tongue and leader, which tend to cause the leader to be withdrawn, together with the tongue, back into the camera between the pressure-applying members as the tongue is withdrawn following feeding of a leader between the pressure-applying members. Spacing apart of the pressure-applying members, or at least relieving the pressure exerted thereby, effectively prevents any undesired movement of the leader as a result of frictional engagement with the tongue. The means of the invention for relieving the pressure exerted by the pressure-applying rolls cooperate with the tongue and the means for moving the tongue for automatically relieving the pressure exerted by the pressure-applying members whenever the tongue is located between the pressure-applying members.

Reference is now made to FIGURE 1 of the drawings wherein there is illustrated, by way of example, apparatus in the form of a camera embodying the invention. The camera designated 10 comprises a housing including a forward section 12 having a forward wall 14 with a generally rectangular recessed section 16 including an exposure aperture 18 through which exposure of photosensitive materials positioned within the camera is effected. A pivotable door 20 is provided for covering recessed section 16 and for acting as a bed on which is mounted a conventional lense and shutter assembly 22 connected to recessed section 16 by a collapsible bellows 24 secured at one end to the lens and shutter assembly, and at its other end to the recessed section in surrounding relation to aperture 18 to provide a chamber through which light is transmitted from the lens and shutter assembly to photosensitive materials positioned for exposure at the rear of recessed section 16. Although the apparatus of the invention is shown in the form of a camera, it should be understood that it may be constructed in the form of a camera back or film-pack holder intended to be mounted on or coupled with the rear of a camera, in which case, the door, lens and shutter assembly and bellows could be eliminated, and the front of the housing would be constructed for attachment to the camera or other exposure device with which the camera back or film-pack holder was to be employed.

The camera housing includes a rear section 26 having rear wall 28 and side walls 30 cooperating with the forward housing section to provide a chamber 32 behind aperture 18 for containing a film pack in position for exposure through the aperture. The film pack is mounted within chamber 32 with a forward portion of the pack located against the rear surface of recessed section 16. Rear housing section 26 is pivotally secured to forward housing section 12 at one end of the housing, herein shown and designated for the purposes of description as the upper end, by hinge 34, thereby permitting the two housing sections to be separated to allow for loading of a film pack into chamber 32. An opening 36 is provided at the lower end of the camera housing intermediate the forward and rear housing sections to permit withdrawal of a film unit from the housing, and a suitable latch (not shown) is provided in the lower portion of the housing for retaining the two housing sections together in the closed or operative position thereof shown in the drawings.

Camera 10 is designed for use with a film pack comprising an assemblage of individual film units each adapted to be exposed and processed to produce a visible image. The camera shown in particularly adapted for use with a film pack of the type disclosed in U.S. Patent No. 2,991,702, issued July 11, 1961, in the name of Vaito K. Eloranta.

The photographic film units comprising this film pack are each adapted to be exposed and processed for producing a positive photographic print and are enclosed in a lightproof container which allows the film units to be exposed in proper succession. Each film unit comprises a photosensitive sheet which may be exposed for producing a photographic image, a second or print-receiving sheet for supporting a positive transfer image formed from the photosensitive sheet, a rupturable container of a fluid agent for reacting with the exposed photosensitive sheet to produce a positive transfer image on the second sheet, and means including a leader for coupling the two sheets and withdrawing the sheets in superposition from the camera between the pressure-applying members. Each film unit, following exposure of the photosensitive sheet thereof, is withdrawn from the container, between the pressure-applying members and from the camera for spreading the processing fluid from the rupturable container of the film unit between the photosensitive and second sheets.

A film pack of this type, designated 108, is shown in FIGS. 3 through 5 of the drawings and comprises a generally parallelpiped shaped container 110 having a forward wall 112, a rear wall 114, end walls 116 and 118, and side walls 120. The container may be formed of any stiff material which is opaque to light actinic to the photosensitive materials carried in the container, cardboard, stiff paper, metal, organic plastics, and the like being suitable for this purpose. The container comprises a first or forward section including forward wall 112, end walls 116 and 118 and side walls 120, and a second or rear section comprising rear wall 114. The construction of the forward section of the container shown is designed for fabrication from organic plastic material and includes laterally projecting flanges 122 along the rearmost edges of side walls 120. Rear wall 114 of the rear section of the container is preferably formed of sheet metal and includes channels 124 at its lateral edges for engaging flanges on side walls 120, and a flange 126 at one edge for engaging end wall 118 to prevent sliding movement of the rear section with respect to the forward section and admission of light into the container. Rear wall 114 is provided with inwardly depressed portions 128 which act as detents cooperating with flange 126 for preventing movement of the rear section relative to the forward section of the container. A rectangular exposure aperture 130 is provided in forward wall 112 for transmitting light to photosensitive materials positioned for exposure within the container underlying the forward wall. A withdrawal opening 132 defined by the rear edge of end wall 116 and rear wall 114 is provided in the end of the container to allow for withdrawal of film units therefrom.

At least one and preferably a plurality of film units each designated 138 are contained entirely within container 110 and are adapted to be withdrawn from the container through opening 132. Each film unit 138 comprises a first or photosensitive sheet 140 and a second or print-receiving sheet 142, the photosensitive sheet comprising a layer of photosensitive material carried on a suitable support, for example a silver halide layer carried on any of the usual film base material such as paper, metallic foils, organic plastics, and the like. Both the photosensitive sheet 140 and the second sheet 142 are rectangular, the latter being substantially equal in width and slightly longer than the photosensitive sheet. The second sheet comprises a flexible material such as paper, organic plastic, metallic foil, and the like; and while the second sheet may be adapted to merely aid in the spreading the fluid processing composition in a thin layer in contact with the photosensitive sheet, in the preferred form, it is adapted to provide a support for a positive transfer print produced, for example, by a silver halide diffusion transfer reversal process such as described in U.S. Patents Nos. 2,543,181, issued February 27, 1951, and 2,662,822, issued December 15, 1953, both in the name of Edwin H. Land. In order to permit processing of the photosensitive materials outside of the camera, the photosensitive and second sheets comprise materials which render the sheets opaque to light actinic to the photosensitive material.

Photosensitive sheet 140 is joined at its leading edge to a first carrier sheet 144 comprising an end section 146, which is approximately equal in width to the photosensitive sheet and is joined to the photosensitive sheet at intermediate section 148, and a narrow elongated leader section 150. Second sheet 142 is mounted on a second carrier sheet 152 comprising a trailing end section 154, an intermediate section 156 coextensive with the second sheet, and a leading end section 158 including a tapered end portion. Intermediate section 156 is provided with a generally rectangular exposure aperture 160 defining the area of the print-receiving sheet against which a fluid processing composition is spread and wherein a transfer print is produced. Trailing end section 154 of the second carrier sheet extends beyond the trailing edge of the second sheet and provides means for collecting and retaining excess processing fluid. Carrier sheets 144 and 152 also provide means for connecting the photosensitive and second sheets, properly locating the photosensitive and second sheets relative to one another when the sheets are superposed, superposing the photosensitive and second sheets, mounting a container of fluid processing composition, moving the film units within the container, and withdrawing the film units from the container and camera between the pressure-applying members.

The photosensitive and second sheets are processed by a fluid composition carried in rupturable container 162 mounted on end section 146 of first carrier sheet 144. Container 162 is formed substantially as shown in the above-mentioned U.S. Patent No. 2,543,181 and comprises a rectangular blank of fluid- and air-impervious sheet material folded longitudinally upon itself to provide two walls bonded together at their margins to form an elongated cavity for the processing fluid. The longitudinal seal is weaker than the end seals so that it becomes unsealed in response to hydraulic pressure generated within the fluid contents of the container by the application of compressive pressure thereto. Container 162 is mounted on end section 146 with this longitudinal edge facing the photosensitive sheet.

The components of film unit 138 are assembled for exposure in a film pack in the relative positions shown in FIG. 4 of the drawings. The photosensitive and print-receiving sheets 140 and 142 overlie one another with the photosensitive and print-receiving layers thereof facing in the same direction and the photosensitive layer located outermost in position for exposure. The leading and trailing edges of each sheet are located adjacent, respectively, the trailing and leading edges of the other sheet. The first carrier sheet 144 is folded adjacent the leading edge of photosensitive sheet 140 so as to extend between the photosensitive and second sheets toward the trailing end of the photosensitive sheet. Second carrier sheet 152 is folded adjacent the leading end of the second sheet so that carrier sheet 152 extends toward the trailing end of the second sheet to a position approximately midway between the ends of the photosensitive and second sheets where tapered leading end section 158 is folded and is joined to tapered section 148 of first carrier sheet 144.

Each film unit is assembled around a dividing element in the form of a pressure plate 164 mounted within container 110. Pressure plate 164 comprises a generally flat planar section approximately equal in width to container 110, underlying exposure aperture 130 and extending beyond the edges of the exposure aperture. The pressure plate includes a rearwardly extending rolled edge section 166 at its trailing edge, rearwardly extending flanges 168 at its lateral edges, and a leading end section 170 including a first portion 172, disposed substantially in a plane parallel with the planar portion of the pressure plate and located rearwardly thereof, and an end portion 174 extending forwardly at a right angle with the intermediate portion. Portions of rear wall 114 are punched out and deformed inwardly to provide springs 180 for engaging flanges 168 and thereby urging pressure plate 164 against forward wall 112. The film units are disposed within container 110 with the photosensitive sheet of each film unit located forward of the pressure plate between the latter and forward wall 112. End section 146 of first carrier sheet 144 of each film unit extends around rolled end section 166 of the pressure plate; and the second sheet, tapered section 144 and leader section 150 of the first carrier sheet, and second carrier sheet 152 are all disposed behind the pressure plate between it and rear wall 114. The photosensitive sheets are arranged in one stack forward of the pressure plate across exposure aperture 130 in position for exposure, and the second sheets are located in a second stack to the rear of the pressure plate with their leading edges located adjacent withdrawal opening 132 in position to be withdrawn through the opening. A pair of cover sheets 182 are provided, located in superposed relation across exposure aperture 130 between forward wall 112 and the foremost photosensitive sheet, to prevent exposure of the photosensitive sheet. The cover sheets, formed of a light opaque sheet material, are provided in duplicate to preclude any chance of exposure of the photosensitive sheet due to a minute hole in one of the cover sheets, and a leader 184 is connected to the leading ends of the cover sheets and extends through withdrawal opening 132 from the container to provide means for withdrawing the cover sheets from the container following loading of the pack into a camera.

Each film unit 138 includes means by which the film unit may be engaged for withdrawing leader section 150 of the film unit from the film pack container through the withdrawal opening therein and from the camera between the pressure-applying members. This means, in the form shown, comprises a clip 188 formed by folding a rectangular blank of thin sheet material upon itself intermediate its ends, to provide an engagement section 190 and a base section 192, both extending in substantially the same direction closely adjacent one another. Engagement section 190 and base section 192 are bent slightly, at a location intermediate their ends, to promote retention of the clip in engagement with a sheet located between the two sections of the clip and for the equally important purpose of causing engagement section 190 to diverge from the adjacent portion of base section 192 when the clip is engaged around a sheet. Clip 188 is attached to leader section 150 at the base section of the clip with the folded portion of the clip located adjacent the leading edge of the leader section. For further examples and details of clips of the type shown, reference may be had to U.S. Patent No. 2,978,971, issued April 11, 1961, in the name of Wiliam H. Eburn, Jr.

Clip 188 of each film unit is engaged around the leading edge of second carrier sheet 152 with engagement section 190 of the clip located to the rear of the second carrier sheet in position to be engaged and moved from the film pack between the pressure-applying members of the camera. In order to permit engagement and movement of the clips from film pack container 110, rear wall 114 of the container is provided adjacent withdrawal opening 132 with an opening 194 extending inwardly from the edge of the rear wall and overlying leader sections 150 and clips 188 attached thereto.

Camera 10 comprises a pair of juxtaposed pressure-applying members mounted within chamber 32 at the lower end thereof adjacent opening 36. The pressure-applying members are shown in the form of a pair of generally cylindrical rolls 40 and 42 mounted for pivotal movement about axes which are located substantially in a common plane and extend transversely of the direction of movement of the film units through opening 36 and across the opening. Roll 40 includes a pair of stub shafts 44 at its ends journaled in support members 46 mounted within the lower end portion of rear housing section 26 adjacent side walls 30. Roll 42 also includes a pair of stub shafts 48 at its ends mounted for rotation at the ends of a pair of arms 50, in turn mounted for pivotal movement intermediate their ends on pivots 52 secured in recesses provided between the outside walls of forward housing section 12 and the side walls of recessed section 16. As a means for urging the pressure-applying rolls toward one another, cantilever springs 54 are provided mounted within the last-mentioned recesses between the outer side walls of the forward housing section and recessed section 16. Springs 54 are mounted to bear against the ends of arms 50 so as to urge the arms (in a counterclockwise direction viewing FIG. 8) in such a way as to bias roll 42 toward roll 40.

The rolls may be mounted with a small initial spacing therebetween, which spacing is obtained by constructing support members 46 to engage the end portions of arms 50 when the two housing sections of the camera are in the closed and operative position shown. The pressure-applying rolls are mounted separately on the forward and rear housing sections of the camera so that the rolls may be spaced apart from one another when the housing is opened to permit loading of a film pack into the camera. This construction permits leader 184, coupled with cover sheets 182, to be positioned between the rolls with a portion of the leader extending from the camera through opening 36 where the leader may be grasped for withdrawing the cover sheets from the film pack and camera.

As previously noted, the camera is provided with manually operable means, shown in FIGS. 1, 2, and 6 through 8, for engaging clips 188 of the film units and feeding the clips and leader sections 150 attached thereto between the pressure-applying rolls and from the housing to a position at which the leader sections may be grasped for withdrawing the film units from the housing between the pressure-applying rolls. This means comprises a thin, elongated strip or tongue 60 formed of a strong, flexible sheet material having at least more rigidity than the sheet material comprising the film unit. Tongue 60 is preferably in the form of a flat spring which can be deformed, but which tends to assume a flat or planar configuration, sheet metal and organic plastic materials being suitable for this purpose. Guide means are provided in the camera mounted on rear wall 28 for guiding tongue 60 along rear wall 28 behind the film pack held in chamber 32, thence downwardly and forwardly into the pack through opening 194 and thence in engagement with a clip 188 between rolls 40 and 42 from the camera through opening 36. In the form shown, the guide means comprises a support member 62 mounted on rear wall 28 and having a support surface facing forwardly within the camera housing. The support surface includes a first section designated 64 which is inclined away from the inner surface of rear wall 28 toward the front of the camera, and a second section 66 which blends into the first section, is located in a plane generally parallel with the focal plane of the camera and extends toward the gap between the pressure-applying rolls. A cover plate 68, having a channel therein, is provided secured to rear wall 28 and the first and second sections 64 and 66 of the support surface of guide member 62 and cooperates with the inner surface of rear wall 28 and the support surface of the guide member to form a channel in which tongue 60 is movable in the direction of its elongation.

Tongue 60 is intended to be moved manually and, for this purpose, a slot 70 is provided in rear wall 28 underlying strip 60. A manually engageable member 72 is secured to the upper end portion of tongue 60 by a pin 74 which projects through slot 70, the latter allowing member 72 to be located externally of rear wall 28 where it may be manually engaged for moving the tongue in the direction of its elongation within the channel provided by rear wall 28, guide member 62 and cover plate 68. Tongue 60 is provided with a base section 75 and a narrower leading end section 76, and cover plate 68 is provided with a slot 78 in the portion thereof overlying second section 66 of guide member 62. Slot 78 is narrower than base section 75 of the tongue and just slightly wider than end section 76 so that the cover plate cooperates with the second section of the guide surface to guide base section 75 of tongue 60 toward and through the gap between the pressure-applying members. However, it is desirable that the leading end section of the tongue which engages clips 188 move into the film pack toward leader sections 150 supported on first portion 172 of the leading end section of pressure plate 164 in order to insure engagement of clips 188 by end section 76. Slot 78 allows leading end section 76 of the tongue to project forwardly and toward the pressure-applying rolls in the same direction as first section 64 of the support surface of member 62 during a short portion of the movement of the tongue so that the end section of the tongue moves forwardly and downwardly through opening 194 into the pack leading end 170 of pressure plate 164. Then, as the base section of tongue 60 becomes engaged by the portions of cover plate 68 bordering slot 78, the tongue is bent rearwardly so that the leading edge of end section 76 follows a curved path until the end section is disposed in the plane of second section 66 of the guide surface, whereafter the end section of the tongue moves in this plane between the pressure-applying rolls.

To operate the leader-feeding means, the person using the camera engages member 72, sliding the latter toward the pressure-applying rolls until a leader section 150 has been fed between the rolls from the camera, whereupon member 72 is returned to its original position, shown in FIGURE 1, in readiness to feed another leader from the camera. The leader fed from the camera may then be grasped for withdrawing a film unit between the pressure-applying rolls through opening 36 from the camera. In order to insure freedom of movement of tongue 60 and a clip 188 engaged thereby between the pressure-applying rolls and for preventing the leader section 150 to which the clip is secured from moving back into the camera together with tongue 60 as the latter is withdrawn into the camera, means are provided, coupled with the tongue, for at least relieving the pressure exerted by the pressure-applying rolls whenever the tongue extends between the pressure-applying rolls. This last-mentioned pressure-relieving means may take several forms, including means for spacing the pressure-applying rolls apart from one another, or means for relieving the bias on arms 50 which mount roll 42.

The means for relieving the pressure exerted by the pressure-applying rolls is shown in FIGS. 1 and 2 of the drawings as being adapted to engage the rolls for spacing the rolls apart from one another. This means comprises a pair of elongated elements 80 mounted on rear wall 28 of the camera housing for generally linear movement toward and away from the pressure-applying rolls. Each of elements 80 is mounted on the rear wall by a headed pin 82 secured to the rear wall and engaged in a slot 84 in the element. The lower end portion of each of elements 80 is bent forwardly and is provided with a wedge-shaped foot 86 located at the bite of the pressure-applying rolls adjacent an end thereof. Wedge-shaped feet 86 are designed to be moved (downwardly) between and into engagement with the end portions of the pressure-applying rolls to force the pressure-applying rolls apart and hold them in a spaced-apart position for as long as tongue 60 is located between the rolls.

As a means for automatically actuating elements 80 simultaneously with the movement of tongue 60 and in response to the movement of member 72, there are provided a pair of levers 88 and 89 each pivotally secured at one end with a pin 90 on rear wall 28 adjacent side walls 30 near the end of the camera housing opposite the pressure-applying rolls. Levers 88 and 89 extend in opposite directions toward and into engagement with one another at their opposite ends, and into engagement with pin 74 secured to member 72 and tongue 60. A slot 92 is provided in cover plate 68 to receive pin 74 and allow the pin to project into chamber 32 into engagement with levers 88 and 89. Each of elements 80 is pivotally secured at its upper end to one of levers 88 and 89 intermediate the ends of the lever, the precise position of pivotal attachment of each element 80 and lever 88 being dependent on the mechanical advantage sought to be derived from the system, that is, the linear movement which is to be imparted to the element in response to pivotal movement of the lever through a predetermined arc which is, in turn, responsive to the linear movement of pin 74. With this construction, it is possible to obtain very large mechanical advantages, for example, the distance moved by pin 74 may be as much as ten times the resultant distance moved by wedges 86. Pivotal movement of the levers is effected by engagement thereof with pin 74 during the initial portion of the movement of pin 74 downward from the position shown in FIGURE 1 to the position shown in broken lines in FIG. 2. By virtue of this construction, the wedge-shaped feet 86 are forced between the pressure-applying rolls to space the rolls apart during the initial movement of tongue 60 before the tongue enters between the pressure-applying rolls. On the return movement of the tongue in response to movement of pin 74 in an upward direction, the levers are engaged and rotated to withdraw wedge-shaped feet 86 from between the pressure-applying rolls during the terminal portion of movement of the tongue following withdrawal of the tongue from between the pressure-applying rolls.

The constructions of the end portions of levers 88 and 89, which contribute to the desired coordination between the spacing of the pressure-applying rolls and the movement of the leader-feeding tongue are shown most clearly in FIGS. 2 and 7. The end of each lever is provided with a pair of fingers, the fingers on the end of lever 88 being designated 94 and 96. Fingers 94 and 96 are located generally parallel to one another and are provided with a space therebetween adapted to receive pin 74 and, accordingly, the spacing is approximately equal in width to the diameter of the pin. The fingers are so constructed as to engage the pin during movement thereof and effect the pivotal movement of lever 88. Lever 89 includes fingers 98 and 100 which are adapted to extend adjacent opposite sides of fingers 94 and 96 when the levers are in the position shown in FIG. 2. In the operation of the device, as pin 74 is moved downwardly during extension of tongue 60, the pin engages finger 94 of lever 88, pivoting the latter in a clockwise direction (viewing FIGS. 2 and 7). Simultaneously, finger 94 engages finger 98, moving the latter downwardly and pivoting lever 89 in a counterclockwise direction. As the arc of movement of the end of finger 94 clears the linear path of movement of pin 74, the pin engages finger 98 of lever 89 continuing the pivotal movement of the latter until the arc of movement of finger 98 is clear of the path of movement of the pin. During this latter portion of the movement of lever 89, finger 100 engages finger 96 of lever 88 continuing the pivotal movement of the latter. This arrangement of fingers on the ends of the levers is necessitated by the fact that the levers are located in substantially the same plane, which is desirable in order to achieve the most compact construction. A torsion spring 102 is provided secured around pin 90 for urging lever 89 in a counterclockwise direction and thereby retaining the fingers of the two levers in engagement with one another. Spring 102 is of sufficient strength to perform this function, but, by itself, is not strong enough to exert torque on lever 89 sufficient to move the lever.

On the return movement of pin 74, the latter engages finger 96, forcing the finger upward against finger 100, pivoting both levers 88 and 89 in counterclockwise and clockwise directions, respectively, to return the levers to their original positions. As a means for guiding the levers and properly restraining the levers in a common plane of movement, there is provided an E-shaped guide plate 104 secured to cover plate 68 adjacent the upper portion of the camera housing. The outer arms 106 of guide plate 104 extend downwardly toward the pressure-applying rolls adjacent cover plate 68 and provide guides for the free ends of levers 88 and 89. The intermediate arm 107 of the guide plate functions as a detent for releasably restraining pin 74 in the inoperative position shown in FIGURE 1.

In another embodiment of the apparatus, shown in FIGS. 7 and 8, means are provided for deforming cantilever springs 54 so as to relieve the bias of the springs on arms 50 which mount pressure-applying roll 42. In this embodiment, elements 30 are somewhat shorter and are provided with forwardly projecting ears 200 each having mounted thereon a pin 202 which extends outwardly toward a side wall 30 of the rear housing section. Each of springs 54 is provided on its free end with an L-shaped cam 204 extending rearwardly toward rear wall 28 and upwardly away from the pressure-applying rolls toward a pin 202. Each cam 204 is constructed to coact with a pin 202 during the downward movement of the pin to displace the cam and cantilever spring rearwardly so as to relieve the bias on an arm 50. In a further modification of the apparatus, cams similar to cams 204 could be provided on the free ends of arms 50, so that engagement of pins 202 with the cams would be effective to pivot arms 50 against the bias of spring 54 and thereby displace roll 42 away from roll 40.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus for treating a photographic film unit which includes a leader by which said film unit is drawn through and from said apparatus, said apparatus comprising, in combination: a pair of pressure-applying members; means mounting said members in juxtaposition and for limited movement toward and away from one another, said juxtaposed members providing means for distributing a fluid within said film unit as said film unit is moved between said members; means for biasing said juxtaposed members toward one another; an element movable in engagement with said leader from a first position at one side of said members, between said members to a second position at the opposite side of said members; drive means coupled with said element for moving said element between said first and second positions; and means coupled with said drive means and responsive thereto for coacting with at least one of said pressure-applying members, said means mounting said members and said means for biasing said members toward one another, to relieve the pressure exerted by said members on said element and said leader for as long as said element is disposed between said pressure-applying members.

2. In photographic apparatus for exposing and thereafter treating a photographic film unit including a leader by which said film unit is moved through said apparatus, in combination: a pair of pressure-applying members; means mounting said members in juxtaposition and for limited movement toward and away from one another, said juxtaposed members providing means for distributing a fluid within said film unit as said film unit is moved between said members; means for biasing said juxtaposed members toward one another; an element movable in engagement with said leader from a first position at one side of said members, between said members to a second position at the opposite side of said members; drive means coupled with said element for moving said element between said first and second positions; and means coupled with said drive means, responsive thereto and including a wedge movable between said pressure-applying members into engagement therewith for spacing said pressure-applying members apart from one another for as long as said element is disposed between said pressure-applying members, the last-mentioned means being operated during the initial portion of movement of said element from said first to said second position to wedge said pressure-applying members apart from one another.

3. In photographic apparatus for exposing and thereafter treating a photographic film unit including a leader by which said film unit is moved through said apparatus, in combination: a pair of pressure-applying members; means mounting said members in juxtaposition and for limited movement toward and away from one another, said juxtaposed members providing means for distributing a fluid within said film unit as said film unit is moved between said members; means for biasing said juxtaposed members toward one another; an element movable in engagement with said leader from a first position at one side of said members, between said members to a second position at the opposite side of said members; drive means coupled with said element for moving said element between said first and second positions; and means coupled with said drive means, responsive thereto and including means for engaging said means for mounting said pressure-applying members to move said members apart.

4. In photographic apparatus for exposing and thereafter treating a photographic film unit including a leader by which said film unit is moved through said apparatus, in combination: a pair of pressure-applying members; means mounting said members in juxtaposition and for limited movement toward and away from one another, said juxtaposed members providing means for distributing a fluid within said film unit as said film unit is moved between said members; a spring for biasing said juxtaposed members toward one another; an element movable in engagement with said leader from a first position at one side of said members, between said members to a second position at the opposite side of said members; drive means coupled with said element for moving said element between said first and second positions; and means coupled with said drive means and responsive thereto during the initial portion of movement of said element from said first to said second position for engaging and deflecting said spring to relieve the bias on said members exerted by said spring for as long as said element is disposed between said pressure-applying members.

5. In photographic apparatus for exposing and thereafter treating a photographic film unit including a leader employed for moving said film unit through said apparatus, in combination: a pair of pressure-applying members; means mounting said members in juxtaposition and for limited movement toward and away from one another, said juxtaposed members providing means for distributing a fluid within said film unit as said film unit is moved between said members; means for urging said juxtaposed members toward one another; an element movable in engagement with said leader from a first position at one side of said members, between said members to a second position at the opposite side of said members; drive means coupled with said element for moving said element between said first and second positions; and means including a wedge coupled with said drive means and movable thereby between said pressure-applying members into engagement therewith for moving said pressure-applying members apart from one another during the initial portion of the movement of said element from said first to said second position, and for retaining said members apart from one another as long as said element is disposed between said pressure-applying members.

6. In photographic apparatus for exposing and thereafter treating a photographic film unit including a leader employed for moving said film unit through said apparatus, in combination: a pair of pressure-applying members; means mounting said members in juxtaposition and for limited movement toward and away from one another, said juxtaposed members providing means for distributing a fluid within said film unit as said film unit is moved between said members; means for urging said juxtaposed members toward one another; an element movable in engagement with said leader from a first position at one side of said members, between said members to a second position at the opposite side of said members; drive means coupled with said element for moving said element between said first and second positions; and means coupled with said drive means and responsive thereto for engaging said means for mounting said pressure-applying members to move said members apart from one another during the initial portion of the movement of said element from said first to said second position, and to retain said members apart from one another as long as said element is disposed between said pressure-applying members.

7. In photographic apparatus for exposing and thereafter treating a photographic film unit including a leader employed for moving said film unit through said apparatus, in combination: a pair of pressure-applying members; means mounting said members in juxtaposition and for limited movement toward and away from one another, said juxtaposed members providing means for distributing a fluid within said film unit as said film unit is moved between said members; a spring for urging said juxtaposed members toward one another; an element movable in engagement with said leader from a first position at one side of said members, between said members to a second position at the opposite side of said members; drive means coupled with said element for moving said element between said first and second positions; and means coupled with said drive means and responsive thereto for engaging and deflecting said spring to relieve the bias on said members exerted by said spring during the initial portion of the movement of said element from said first to said second position, and to deflect said spring and relieve said bias as long as said element is disposed between said pressure-applying members.

8. In photographic apparatus for exposing and thereafter treating a photographic film unit including a leader employed for moving said film unit through said apparatus, in combination, a pair of pressure-applying members; means mounting said members in juxtaposition for limited movement toward and away from one another, said juxtaposed members providing means for distributing a fluid within said film unit during movement thereof between said members; resilient means for biasing said members toward one another; a tongue mounted for movement in engagement with said leader from a first position to one side of said members, between said members to a second position at the opposite side of said members; actuating means coupled with said tongue for moving said tongue between said first and second positions, said actuating means including an actuating element movable between first and second positions during movement of said tongue between said first and second positions, respectively; and means coupled with said actuating element and responsive to coaction therewith for spacing said pressure-applying members apart from one another, the last-mentioned means coacting with said actuating element only during the initial portion of the movement of said actuating element from said first to said second position thereof for spacing said pressure-applying members apart from one another, and during the latter portion of the movement of said actuating element from said second to said first position thereof for allowing said pressure-applying members to move toward one another under the bias of said resilient means.

9. The photographic apparatus of claim 8 wherein said last-mentioned means comprises a wedge movable into engagement with and between said pressure-applying members for spacing said pressure-applying members apart from one another.

10. The photographic apparatus of claim 8 wherein said last-mentioned means includes means for engaging said means mounting said pressure-applying members to move said pressure-applying members apart.

11. The photographic apparatus of claim 8 wherein said last-mentioned means comprises means for engaging and deflecting said resilient means to relieve the bias exerted on said pressure-applying members by said resilient means.

12. The photographic apparatus of claim 8 wherein at least a portion of said tongue is moved linearly, said actuating element is secured to said portion of said tongue for linear movement therewith, and said last-mentioned means comprise pivotable elements having sections movable along arcuate paths in engagement with said actuating element between said first position of said actuating element and another position of said actuating element intermediate said first and second positions thereof.

References Cited in the file of this patent
UNITED STATES PATENTS 2,873,659    Bing _____ Feb. 17, 1959